US012709839B2

(12) United States Patent
Heller et al.

(10) Patent No.: US 12,709,839 B2
(45) Date of Patent: Aug. 18, 2026

(54) USE OF LOW-CYCLEN DERIVATIZED AMINO-FUNCTIONAL SILICONE POLYMERS FOR TREATING FIBROUS SUBSTRATES

(71) Applicant: Wacker Chemie AG, Munich (DE)

(72) Inventors: Anton Heller, Simbach (DE); Elisabeth Grüner, Haiming (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 18/024,058

(22) PCT Filed: Sep. 9, 2020

(86) PCT No.: PCT/EP2020/075247

§ 371 (c)(1),
(2) Date: Mar. 1, 2023

(87) PCT Pub. No.: WO2022/053137

PCT Pub. Date: Mar. 17, 2022

(65) Prior Publication Data

US 2023/0287624 A1 Sep. 14, 2023

(51) Int. Cl.

*D06M 15/643* (2006.01)
*C08G 77/388* (2006.01)
*D06M 15/647* (2006.01)

(52) U.S. Cl.

CPC ....... *D06M 15/6436* (2013.01); *C08G 77/388* (2013.01); *D06M 15/647* (2013.01); *D06M 2200/50* (2013.01)

(58) Field of Classification Search

CPC ...................... D06M 15/6463; D06M 15/6436
See application file for complete search history.

(56) References Cited

U.S. PATENT DOCUMENTS 3,775,452 A 11/1973 Karstedt
4,978,561 A 12/1990 Cray et al.
5,174,813 A 12/1992 Cifuentes et al.
5,389,364 A 2/1995 Cifuentes et al.
5,824,814 A * 10/1998 Cray .................... C08G 77/26 556/401
5,981,681 A 11/1999 Czech
6,576,606 B2 6/2003 Richards, III et al.
7,041,767 B2 5/2006 Lange et al.
7,129,369 B2 * 10/2006 Heller .................. C08G 77/26 556/413
7,897,716 B2 3/2011 Wagner et al.
2008/0075683 A1 3/2008 Herzig et al.

FOREIGN PATENT DOCUMENTS

CN 108779415 A * 11/2018 ............ A61K 8/416
EP 0856553 A1 8/1998
JP 2001515969 A 9/2001
JP 2015500926 A 1/2015
KR 20070072069 A 7/2007
KR 102091458 B1 3/2020

OTHER PUBLICATIONS

Engelhardt et al.: "On the 1H-, 13C- Und 29Si-NMR Chemical Shifts of Some Linear, Branched and Cyclic Methylsiloxane Compounds", J. Organom et al. Chem., 1971, vol. 28, pp. 293-300.
Elizabeth A. Williams: "NMR spectroscopy of organosilicon compounds", The Chemistry of Organic Silicon Compounds, John Wiley and Sons Ltd, (19890000), pp. 511-533.

* cited by examiner

*Primary Examiner* — Alex A Rolland

(57) ABSTRACT

A composition for hydrophilic treatment of fibrous substrates that is washfast in terms of softness contains derivatives of amino-functional organopolysiloxanes containing siloxane units of a general formula (I), optionally siloxane units of a general formula (II), siloxane units of general formula (III), and siloxane units of a general formula (IV). Impurities of octamethylcyclotetrasiloxane (D4 cyclics), decamethylcyclopentasiloxane (D5 cyclics) and dodecamethylcyclohexasiloxane (D6 cyclics) are present in proportions of less than 0.1% by weight in each case and after a storage time of 20 days at a temperature of 50° C. the proportions of D4 cyclics, representative of D4, D5 and D6, remain below 0.1% by weight in each case, based in each case on the total weight of the derivatives of amino-functional organopolysiloxanes.

4 Claims, No Drawings

USE OF LOW-CYCLEN DERIVATIZED AMINO-FUNCTIONAL SILICONE POLYMERS FOR TREATING FIBROUS SUBSTRATES

CROSS-REFERENCE TO RELATED APPLICATION

This application is a U.S. National Phase Application of PCT/EP2020/075247, filed Sep. 9, 2020, the entire disclosure of which is hereby incorporated by reference.

The invention relates to the use of compositions for hydrophilic treatment of fibrous substrates that is washfast in terms of softness containing low-cyclics derivatives of amino-functional organopolysiloxanes.

Commercially available silicone-containing softeners for hydrophilic treatment of fibrous materials in most cases contain amino- or ammonium-functionalized silicone polyethers which require multi-stage production via the costly synthesis route of hydrosilylation. The patent literature contains examples in which Si—H functional polydiorganosiloxanes are reacted with epoxy-functional olefinic compounds under catalysis with platinum-containing compounds. This is followed in a second reaction stage by epoxy ring-opening with amino-functional polyether compounds. Examples thereof may be found in the publications U.S. Pat. Nos. 5,981,681 A, 7,041, 767 B2 or 7,897,716 B2. Another route to amino- or ammonium-functionalized silicone polyethers is via the hydrosilylation of allyl polyethers and subsequent bonding of amine or ammonium to the hydroxyl end group of the polyether via diisocyanates. This is described in US 2008/0075683 A1. In addition to the disadvantage of costly production, the hydrophilic polyether-containing products are not resistant to washing and in some cases exhibit a disruptive intrinsic color on account of the platinum catalyst.

U.S. Pat. No. 6,576,606 B2 describes a cost-effective route to silicone-containing softeners for hydrophilic treatment of fibrous materials without silicone-bonded polyether. Terminally and laterally amino-functionalized polydiorganosiloxane is very completely acetylated with acetic anhydride. Some materials treated therewith exhibit good absorbency and low yellowing but only moderate softness and no washfastness. Partial acetylation of amino-functional polydiorganosiloxanes does improve softness and washfastness but leads to an unacceptable reduction in the hydrophilic properties of textile materials.

After the classification of D4, D5 and D6 cyclics as substances of very high concern (SVHC) by the EU Commission, the requirement that impurities of cyclic oligodimethylsiloxane components having 4 to 6 siloxane units (D4, D5 and D6 cyclics) in polydiorganosiloxane polymers may only be present below a concentration of 1000 ppm in each case is gaining increasing importance in the market. This also includes the requirement that such cyclic oligodimethylsiloxanes are not re-formed in an amount such that the specified threshold is exceeded over a shelf life period, generally between 0.5 and 2 years.

Acetylations of amino-functional polydiorganosiloxanes with acetic anhydride form free acetic acid as a byproduct, the removal of which is not necessary from a performance standpoint. Aqueous formulations of amino-functional polydiorganosiloxanes are generally adjusted to pHs of not more than 7 with acetic acid in any case. However, experience has shown that in the presence of free acetic acid in amino-functional polydimethylsiloxanes the recited cyclic oligodimethylsiloxanes are re-formed in amounts far in excess of the threshold of 1000 ppm over shelf-life periods.

In addition to acetylation with acetic anhydride there are also other acylation options. U.S. Pat. No. 4,978,561 A describes acylations of amino-functional silicones with lactones. When applied to fibrous materials, these amido-functional silicones cause less yellowing of the substrate than their amino-functional precursors. Hydrophilic properties are not described. In the examples, only trimethylsilyl-terminated amino-functional polydimethylsiloxanes are reacted with lactones while hydroxy- or alkoxy-terminated polymers are produced by condensation of amido-functional silanes.

Reactions of aminosilicones with lactones and alkylene carbonates are described in U.S. Pat. No. 5,174,813 A for use in polishes or in U.S. Pat. No. 5,389,364 A for use in hair conditioner formulations.

U.S. Pat. No. 5,824,814 A claims a method for producing viscosity-stable, amido-functional polysiloxanes where the amino-functional precursors are blocked using alcohols or substituted alcohols before further reaction with lactones. Low-cyclics products are not producible by this route without elimination and removal of the alcohol during purification in a thin-film evaporator.

KR 20070072069 A describes the reaction of amino-functional polysiloxanes with glycerol carbonate, wherein the viscosity-stability is said to be achieved by addition of lauryl ethoxylates. In the examples trimethylsilyl-terminated amino-functional polysiloxanes are said to have been reacted over 1 to 12 hours with glycerol carbonate and lauryl ethoxylate at 30° C. to 80° C. without addition of an equilibration catalyst. However, the success of the reaction has not been demonstrated with analytical data. Use on textile fiber substrates showed improved wicking effects upon immersion in water compared to the amino-functional precursor and the corresponding reaction product of this precursor with γ-butyrolactone.

BRIEF SUMMARY

Embodiments of using a composition for hydrophilic treatment of fibrous substrates that is washfast in terms of softness are described below. In an embodiment, the composition contains derivatives of amino-functional organopolysiloxanes containing siloxane units of general formula (I)

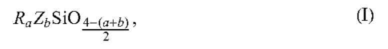

$$R_aZ_bSiO_{\frac{4-(a+b)}{2}}, \quad (I)$$

wherein a is 0, 1 or 2, preferably 0 or 1, b is 1, 2 or 3, preferably 1, with the proviso that the sum of a+b≤3, optionally siloxane units of general formula (II)

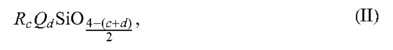

$$R_cQ_dSiO_{\frac{4-(c+d)}{2}}, \quad (II)$$

wherein c is 0, 1 or 2, preferably 0 or 1, d is 1, 2 or 3, preferably 1, with the proviso that the sum of c+d≤3,
siloxane units of general formula (III)

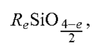 (III)

wherein
e is 0, 1, 2, or 3, preferably 2,
and siloxane units of general formula (IV)

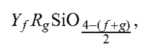 (IV)

wherein
f is 1, 2 or 3, preferably 1,
g is 0, 1 or 2, preferably 2,
with the proviso that the sum of f+g≤3,
R may be identical or different and represents a hydrogen atom or a monovalent, optionally fluorine-, chlorine- or bromine-substituted, $C_1$-to $C_{18}$-hydrocarbon radical,
Z represents a group of general formula (V)

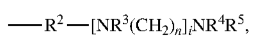 (V)

wherein
i is 0, 1, 2, 3 or 4,
n is 2, 3, 4, 5 or 6,
$R^2$ represents a divalent, linear or branched $C_1$-to $C_{18}$-hydrocarbon radical,
$R^3$ represents a hydrogen atom, an optionally fluorine-, chlorine-, bromine-, hydroxy- or $C_1$-to $C_5$-alkoxy-substituted $C_1$-to $C_{18}$-hydrocarbon radical, or an acyl radical or a radical of general formula (VI),
with the proviso that at least a portion of the radicals Y are radicals of formula (IX). Impurities of octamethylcyclotetrasiloxane (D4 cyclics), decamethylcyclopentasiloxane (D5 cyclics) and dodecamethylcyclohexasiloxane (D6 cyclics) are present in proportions of less than 0.1% by weight in each case and after a storage time of 20 days at a temperature of 50° C. the proportions of D4 cyclics, representative of D4, D5 and D6, remain below 0.1% by weight in each case, based in each case on the total weight of the derivatives of amino-functional organopolysiloxanes.

DETAILED DESCRIPTION $R^4$ represents a radical of general formula (VI),

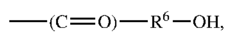 (VI)

$R^5$ represents a hydrogen atom or an optionally fluorine-, chlorine-, bromine-, hydroxy- or $C_1$-to $C_5$-alkoxy-substituted $C_1$-to $C_{18}$-hydrocarbon radical or an acyl radical, $R^6$ represents a divalent, linear or branched $C_2$-to $C_8$-hydrocarbon radical or an—$OR^7$-radical, $R^7$ represents a divalent linear or branched $C_2$-to $C_8$-hydrocarbon radical, Q represents a group of general formula (VII)

(VII)
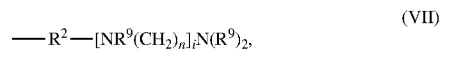

wherein i and n are as defined above, $R^9$ may be identical or different and represents a hydrogen atom, an optionally fluorine-, chlorine-, bromine-, hydroxy- or $C_1$-to $C_5$-alkoxy-substituted $C_1$-to $C_{18}$-hydrocarbon radical or an acyl radical, Y represents a radical of general formula (VIII) and/or (IX), (VIII)
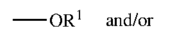 and/or
(IX)
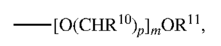

wherein
m is 0 or an integer from 1 to 100, preferably 1 to 20, and
p is 2, 3 or 4,
$R^1$ represents a hydrogen atom or a $C_1$-to $C_4$-alkyl radical,
$R^{10}$ represents a hydrogen atom or a $C_1$-to $C_{18}$-hydrocarbon radical,
$R^{11}$ represents a hydrogen atom, a $C_1$-to $C_{10}$-hydrocarbon radical, preferably a $C_4$-to $C_{10}$-hydrocarbon radical,
or a group of formula

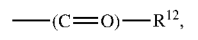

$R^{12}$ represents a $C_1$-to $C_{10}$-hydrocarbon radical or an —$OR^{13}$— radical, and
$R^{13}$ represents a $C_1$-to $C_{10}$-hydrocarbon radical, It is an object of the present invention to provide ideally colorless, cost-effectively producible organopolysiloxane-containing compositions for treatment of fibrous substrates, for example textile fiber materials, which provide these substrates with exceptional softness, hydrophilic properties and good washfastness in respect of softness. For easy processability the components of the organopolysiloxane-containing compositions shall preferably have viscosities of less than 5000 mPa·s at 25° C. In addition, these compositions shall have oigodimethylsiloxane proportions having 4 to 6 siloxane units (D4 to D6 cyclics) below a concentration of 1000 ppm in each case, based on the organopolysiloxane polymer, and reformation of such cyclics should occur to the least possible extent upon room-temperature storage. This property is what is to be understood hereinbelow by the term "low-cyclics". Its importance is equal to that of the other properties since in many cases non-low-cyclics products are no longer being employed for health and environmental reasons since the introduction of the SVHC classification.

The object is achieved by the invention.

The present invention provides for the use of compositions for hydrophilic treatment of fibrous substrates that is washfast in terms of softness containing low-cylics derivatives of amino-functional organopolysiloxanes containing siloxane units of general formula (I)

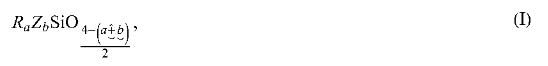

wherein
- a is 0, 1 or 2, preferably 0 or 1,
- b is 1, 2 or 3, preferably 1,
- with the proviso that the sum of a+b≤3,
- optionally siloxane units of general formula (II)

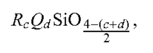
(II)

wherein
- c is 0, 1 or 2, preferably 0 or 1,
- d is 1, 2 or 3, preferably 1,
- with the proviso that the sum of c+d≤3,
- siloxane units of general formula (III)

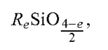
(III)

wherein
- e is 0, 1, 2, or 3, preferably 2,
- and siloxane units of general formula (IV)

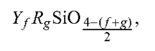
(IV)

wherein
- f is 1, 2 or 3, preferably 1,
- g is 0, 1 or 2, preferably 2,
- with the proviso that the sum of f+g≤3,
- wherein R may be identical or different and represents a hydrogen atom or a monovalent, optionally fluorine-, chlorine- or bromine-substituted, $C_1$- to $C_{18}$-hydrocarbon radical, Z represents a group of general formula (V)

(V)
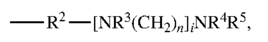

wherein
- i is 0, 1, 2, 3 or 4,
- n is 2, 3, 4, 5 or 6,
- $R^2$ represents a divalent, linear or branched $C_1$- to $C_{18}$-hydrocarbon radical,
- $R^3$ represents a hydrogen atom, an optionally fluorine-, chlorine-, bromine-, hydroxy- or $C_1$- to $C_5$-alkoxy-substituted $C_1$- to $C_{18}$-hydrocarbon radical, an acyl radical or a radical of general formula (VI),
- $R^4$ represents a radical of general formula (VI), (VI)
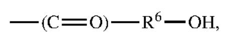

- $R^5$ represents a hydrogen atom or an optionally fluorine-, chlorine-, bromine-, hydroxy- or $C_1$- to $C_5$-alkoxy-substituted $C_1$- to $C_{18}$-hydrocarbon radical or an acyl radical,
- $R^6$ represents a divalent, linear or branched $C_2$- to $C_8$-hydrocarbon radical or an —$OR^7$-radical,
- $R^7$ represents a divalent linear or branched $C_2$- to $C_8$-hydrocarbon radical,
- Q represents a group of general formula (VII)

(VII)
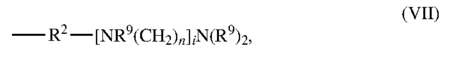

wherein
- $R^2$, i and n are as defined above,
- $R^9$ may be identical or different and represents a hydrogen atom, an optionally fluorine-, chlorine-, bromine-, hydroxy- or $C_1$-to $C_5$-alkoxy-substituted $C_1$- to $C_{18}$-hydrocarbon radical or an acyl radical,
- Y represents a radical of general formula (VIII) and/or (IX), (VIII)
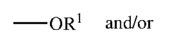
(IX)
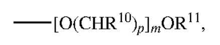

wherein
- m is 0 or an integer from 1 to 100, preferably 1 to 20, and
- p is 2, 3 or 4,
- $R^1$ represents a hydrogen atom or a $C_1$- to $C_4$-alkyl radical,
- $R^{10}$ represents a hydrogen atom or a $C_1$- to $C_{18}$-hydrocarbon radical,
- $R^{11}$ represents a hydrogen atom, a $C_1$- to $C_{10}$-hydrocarbon radical, preferably a $C_4$- to $C_{10}$-hydrocarbon radical, or a group of general formula

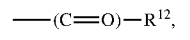

- $R^{12}$ represents a $C_1$- to $C_{10}$-hydrocarbon radical or O—$R^{13}$ and $R^{13}$ represents a $C_1$- to $C_{10}$-hydrocarbon radical,
- with the proviso that at least a portion of the radicals Y are radicals of formula (IX),
- with the proviso that impurities of octamethylcyclotetrasiloxane (D4 cyclics), decamethylcyclopentasiloxane (D5 cyclics) and dodecamethylcyclohexasiloxane (D6 cyclics) are present in proportions of less than 0.1% by weight in each case and after a storage time of 20 days at a temperature of 50° C. the proportions of D4 cyclics, representative of D4, D5 and D6, remain below 0.1% by weight in each case, based in each case on the total weight of the derivatives of amino-functional organopolysiloxanes.

In the context of the present invention the term organopolysiloxanes is to be understood as meaning polymeric as well as dimeric and oligomeric siloxanes.

Examples of hydrocarbon radicals R include alkyl radicals, such as the methyl, ethyl, n-propyl, isopropyl, 1-n-butyl, 2-n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical, cycloalkyl radicals, such as cyclopentyl, cyclohexyl, cycloheptyl and methylcyclohexyl radicals, aryl radicals, such as the phenyl, naphthyl, anthryl and phenanthryl radical, alkaryl radicals, such as o-, m-, p-tolyl radicals, xylyl radicals and ethylphenyl radicals, and aralkyl radicals, such as the benzyl radical and the β- and β-phenylethyl radicals.

The hydrocarbon radicals R optionally contain an aliphatic double bond. Examples include alkenyl radicals such as the vinyl, allyl, 5-hexen-1-yl, E-4-hexen-1-yl, Z-4-hexen-1-yl, 2-(3-cyclohexenyl)ethyl and cyclododeca-4,8-dienyl radical. Preferred radicals R having an aliphatic double bond are the vinyl, allyl and 5-hexen-1-yl radical. However, it is preferable when not more than 1% of the hydrocarbon radicals R contain a double bond.

Examples of substituted radicals R include haloalkyl radicals, such as the 3,3,3-trifluoro-n-propyl radical, the 2,2,2,2',2',2'-hexafluoroisopropyl radical, the heptafluoroisopropyl radical and haloaryl radicals, such as the o-, m- and p-chlorophenyl radical.

The radical R is preferably a monovalent hydrocarbon radical having 1 to 6 carbon atoms, wherein the methyl radical is particularly preferred.

Examples of hydrocarbon radicals $R^1$ include alkyl radicals, such as the methyl, ethyl, n-propyl, isopropyl, 1-n-butyl, 2-n-butyl, isobutyl and tert-butyl radical, wherein $C_1$-$C_3$-alkyl radicals are preferred.

Examples of alkyl radicals $R^1$ substituted by an ether oxygen include the methoxyethyl and the ethoxyethyl radical. Preferred examples of the group $—OR^1$ include the hydroxy and methoxy radicals.

$R^2$ is preferably a divalent $C_2$-$C_6$-hydrocarbon radical,

Examples of divalent hydrocarbon radicals $R^2$ include saturated linear, branched and cyclic alkylene radicals, such as the methylene and ethylene radical and also propylene, butylene, pentylene, hexylene, 2-methylpropylene, cyclohexylene and octadecylene radicals, or unsaturated alkylene or arylene radicals, such as the hexenylene radical and phenylene radicals, wherein the n-propylene radical and the 2-methylpropylene radical are particularly preferred.

Examples of hydrocarbon radicals R, with the exception of those having an aliphatic double bond, apply in full to hydrocarbon radicals $R^3$, $R^5$ and $R^9$. It is preferable when $R^3$, $R^5$ and $R^9$ are a hydrogen atom, a methyl radical, a cyclohexyl radical or an acyl radical, such as the acetyl radical.

Preferred alkylene radicals for $R^6$ are the ethylene, propylene, butylene and pentylene radicals, the propylene radical being particularly preferred.

Preferred alkylene radicals for $R^7$ are the ethylene, isopropylene and ethylethylene radicals, the isopropylene radical being particularly preferred.

Preferred examples of Q include

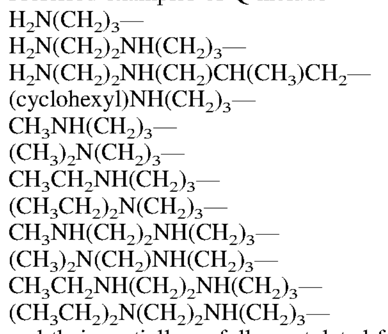

$H_2N(CH_2)_3—$
$H_2N(CH_2)_2NH(CH_2)_3—$
$H_2N(CH_2)_2NH(CH_2)CH(CH_3)CH_2—$
(cyclohexyl)$NH(CH_2)_3—$
$CH_3NH(CH_2)_3—$
$(CH_3)_2N(CH_2)_3—$
$CH_3CH_2NH(CH_2)_3—$
$(CH_3CH_2)_2N(CH_2)_3—$
$CH_3NH(CH_2)_2NH(CH_2)_3—$
$(CH_3)_2N(CH_2)NH(CH_2)_3—$
$CH_3CH_2NH(CH_2)_2NH(CH_2)_3—$
$(CH_3CH_2)_2N(CH_2)_2NH(CH_2)_3—$ and their partially or fully acetylated forms.

Particularly preferred examples of Q include:

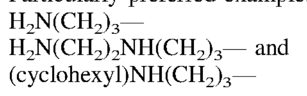

$H_2N(CH_2)_3—$
$H_2N(CH_2)_2NH(CH_2)_3—$ and
(cyclohexyl)$NH(CH_2)_3—$

The compositions according to the invention preferably employ low-cyclics derivatives of amino-functional organopolysiloxanes of general formula (X).

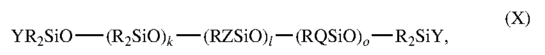

$$YR_2SiO—(R_2SiO)_k—(RZSiO)_l—(RQSiO)_o—R_2SiY, \quad (X)$$

wherein

R, Y, Z and Q are as defined above, k is an integer from 50 to 700,

I is an integer from 1 to 30, preferably 1 to 10, particularly preferably 1 to 5, and o is an integer from 0 to 30, preferably 1 to 15, particularly preferably 1 to 6, with the proviso that at least a portion of the radicals Y are radicals of formula (IX).

It is preferable when at least 1 mol %, preferably at least 5 mol %, and at most 99 mol %, preferably at most 60 mol %, of the radicals Y are radicals of formula (IX).

In the context of the present invention formula (X) is to be understood as meaning that k units of $—(R_2SiO)—$, I units of —(RZSiO)— and o units of —(RQSiO— may be distributed in the organopolysiloxane molecule in any desired fashion, for example blockwise or randomly.

If the radical Y in the derivatives of amino-functional organopolysiloxanes according to the invention, preferably in those of formula (X), corresponds to radical of formula (VIII) it is preferably a hydroxyl and/or methoxy radical. A portion of the radicals Y in the derivatives of amino-functional organopolysiloxanes according to the invention, preferably in those of formula (X), corresponds to (iso) oxyalkyl radicals of formula (IX), wherein it is preferable when $C_4$-$C_{10}$-alkoxy radicals or $C_4$-$C_{10}$-monoalkyl glycol ether radicals, preferably $C_4$-$C_{10}$-monoalkyl glycol ether radicals are concerned, in addition to radicals of formula (VIII) which are preferably hydroxyl and/or methoxy radicals.

Within or along the siloxane chain of the siloxanes of the abovementioned formula, and as is typically not shown by such formulae, other siloxane units may also be present in addition to the diorganosiloxane units $R_2SiO$. Examples of such other siloxane units, usually only present as impurities, include those of formulae $RSiO_{3/2}$, $R_3SiO_{1/2}$ and $SiO_2$, wherein R is as defined above.

The present invention further provides a process for producing the low-cyclics derivatives of amino-functional organopolysiloxanes employed in the compositions according to the invention by reacting amino-functional organopolysiloxanes (1) containing amino-functional siloxane units of general formula (II)

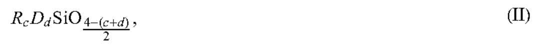

$$R_cD_dSiO_{\frac{4-(c+d)}{2}}, \quad (II)$$

wherein Q, R, c and d are as defined above, and siloxane units of general formula (XII)

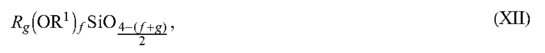

$$R_g(OR^1)_fSiO_{\frac{4-(f+g)}{2}}, \quad (XII)$$

wherein R, $R^1$, f and g are as defined above, with compounds (2) of general formula (XI)

(XI)

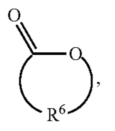

wherein $R^6$ is as defined above, and compounds (3) of general formula (XIII)

(XIII)

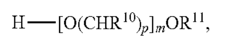

wherein $R^{10}$, $R^{11}$, m and p are as defined above, with the proviso that in the obtained derivatives of amino-functional organopolysiloxanes the content of D4, D5 and D6 cyclics is less than 0.1% by weight in each case as a result of effecting distillative removal of the cyclics before, during or after the reaction.

Examples of compounds (2) of general formula (XI) include lactones or cyclic carbonic esters.

Examples of lactones include β- and γ-butyrolactone, γ-valerolactone, α-angelicalactone, δ-valerolactone and ε-caprolactone. A preferred example of a lactone is γ-butyrolactone. Examples of cyclic carbonic esters include ethylene carbonate, propylene carbonate, 1,2-butylene carbonate and 1,2-hexylene carbonate. A preferred example of a cyclic carbonic ester is propylene carbonate.

The lactones or cyclic carbonic esters are employed in amounts of 3 to 100 mol %, preferably 6 to 90 mol %, particularly preferably 14 to 83 mol %, in each case based on the derivatizable amine content of the employed amino-functional organopolysiloxanes (1) for production of the low-cyclics, derivatized amino-functional organopolysiloxanes.

Surprisingly, the use of these hydroxy-free lactones and cyclic carbonic acid esters in the compositions according to the invention causes the fibrous substrates to become wettable more quickly after use of the compositions according to the invention than after use of hydroxy-containing lactones, for example gluconolactone, or corresponding hydroxy-containing carbonic esters, for example glycerol carbonate.

Examples of compounds (3) of general formula (XIII) include alcohols and monoalkyl glycol ethers. Examples of alcohols include methanol and $C_6$- to $C_{10}$-alcohols nonvolatile under synthesis conditions and liquid at room temperature, such as n-hexanol, n-heptanol, n-octanol, 2-ethylhexanol, n-decanol and 2-methoxypropanol and 2-butoxyethanol.

Examples of monoalkyl glycol ethers include adducts of alcohol, ethylene oxide, propylene oxide and copolymers thereof. Preferred examples of monoalkyl glycol ethers include diethylene glycol monobutyl ether, dipropylene glycol monomethyl ether, n-hexyl glycol and propylene glycol monobutyl ether, wherein diethylene glycol monobutyl ether and dipropylene glycol monomethyl ether are particularly preferred examples.

The alcohols or adducts of alcohols (3) are employed in amounts of 1 to 50 percent by weight, preferably of 1 to 10 percent by weight, particularly preferably of 2 to 7 percent by weight, in each case based on the total weight of the components for producing the low-cyclics, derivatized amino-functional organopolysiloxanes.

The addition of alcohols with not more than 10 carbon atoms or adducts thereof has the effect that during production of the low-cyclics derivatized amino-functional organopolysiloxanes viscosities at 25° C. of preferably less than 5000 mPas·s, preferably 500 to 5000 mPa·s, are achieved and also that in the case of reaction of all 3 components simultaneously in one synthesis stage the miscibility of the amino-functional organopolysiloxane with the employed lactones or cyclic carbonic esters is improved.

The reactions are carried out at temperatures of 10° C. to 130° C., preferably of 50° C. to 120° C. and particularly preferably of 60° C. to 90° C. If low-cyclics amino-functional organopolysiloxanes are employed it is immaterial whether the reactions of amino-functional organopolysiloxanes (1) with compounds (2) of general formula (XI) and compounds (3) of general formula (XIII) are performed simultaneously or the reaction of amino-functional organopolysiloxanes (1) with compounds (2) of general formula (XI) is carried out first and the reaction with compounds (3) of general formula (XIII) is carried out subsequently or the reactions are carried out in the reverse sequence. If a removal of D4, D5 and D6 cyclics from the derivatized amino-functional silicone polymers, preferably in a thin-film evaporator, is required the process steps should preferably be carried out in the following sequence: First, reaction of amino-functional organopolysiloxanes (1) with compounds (2) of general formula (XI), then distillative removal of the D4, D5 and D6 cyclics, preferably purification by short-path distillation or using a thin-film evaporator, and finally, preferably in the cooling process, reaction with compounds (3) of general formula (XIII), this having the advantage that there is no associated loss of compounds (3) of general formula (XIII).

As amino-functional organopolysiloxanes (1) the process for producing low-cyclics derivatives of amino-functional organopolysiloxanes preferably employs those of general formula (XIV)

(XIV)

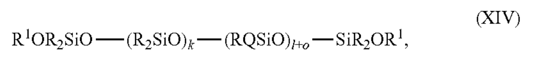

wherein

R $R^1$, k, l and o are all as defined above.

The compositions according to the invention for hydrophilic treatment of fibrous substrates that is washfast in terms of softness containing low-cyclics derivatives of amino-functional organopolysiloxanes may be solutions of these derivatives of amino-functional organopolysiloxanes in organic solvents.

It is preferable when the compositions according to the invention for hydrophilic treatment of fibrous substrates that is washfast in terms of softness are aqueous emulsions containing low-cyclics derivatives of amino-functional organopolysiloxanes (A) according to the invention emulsifiers (B) and/or co-emulsifiers (B') and water (C).

The invention therefore provides aqueous emulsions for hydrophilic treatment of fibrous substrates that is washfast in terms of softness containing low-cyclics derivatives of amino-functional organopolysiloxanes (A) according to the invention emulsifiers (B) and/or co-emulsifiers (B') and water (C).

Employable emulsifiers (B) include nonionic, anionic or cationic emulsifiers or else mixtures thereof.

The aqueous emulsions according to the invention for hydrophilic treatment of fibrous substrates that is washfast in terms of softness contain emulsifiers and mixtures thereof that are known per se.

Suitable anionic emulsifiers especially include:

1. Alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) or propylene oxide (PO) units.

2. Sulfonates, particularly alkyl sulfonates having 8 to 18 carbon atoms, alkylaryl sulfonates having 8 to 18 carbon atoms, taurides, esters and monoesters of sulfosuccinic acid with monohydric alcohols or alkylphenols having 4 to 15 carbon atoms; these alcohols or alkylphenols may optionally also be ethoxylated with 1 to 40 EO units.

3. Alkali metal and ammonium salts of carboxylic acids having 8 to 20 carbon atoms in the alkyl, aryl, alkaryl or aralkyl radical.

4. Phosphoric acid partial esters and the alkali metal and ammonium salts thereof, particularly alkyl and alkaryl phosphates having 8 to 20 carbon atoms in the organic radical, alkyl ether and alkaryl ether phosphates having 8 to 20 carbon atoms in the alkyl or alkaryl radical and 1 to 40 EO units.

Suitable nonionic emulsifiers especially include:

5. Polyvinyl alcohol still containing 5% to 50%, preferably 8% to 20%, of vinyl acetate units and having a degree of polymerization of 500 to 3000.

6. Alkyl polyglycol ethers, preferably those having 8 to 40 EO units and alkyl radicals of 8 to 20 carbon atoms.

7. Alkylaryl polyglycol ethers, preferably those having 8 to 40 EO units and 8 to 20 carbon atoms in the alkyl and aryl radicals.

8. Ethylene oxide/propylene oxide (EO/PO) block copolymers, preferably those having 8 to 40 EO or PO units.

9. Addition products of alkylamines having alkyl radicals of 8 to 22 carbon atoms with ethylene oxide or propylene oxide.

10. Fatty acids having 6 to 24 carbon atoms.

11. Alkyl polyglycosides of general formula $R^*\text{-}OZ_O$, wherein R* represents a linear or branched, saturated or unsaturated alkyl radical having on average 8-24 carbon atoms and $Z_O$ represents an oligoglycoside radical having on average o=1-10 hexose or pentose units or mixtures thereof.

12. Naturally occurring substances and their derivatives, such as lecithin, lanolin, saponins, cellulose, cellulose alkyl ethers and carboxyalkyl celluloses whose alkyl groups each have up to 4 carbon atoms.

13. Linear organo(poly)siloxanes containing polar groups, in particular those comprising alkoxy groups having up to 24 carbon atoms and/or up to 40 EO and/or PO groups.

Suitable cationic emulsifiers especially include:

14. Salts of primary, secondary and tertiary fatty amines having 8 to 24 carbon atoms with acetic acid, sulfuric acid, hydrochloric acid and phosphoric acids.

15. Quarternary alkyl and alkylbenzeneammonium salts, especially those whose alkyl groups have 6 to 24 carbon atoms, especially halides, sulfates, phosphates and acetates.

16. Alkylpyridinium, alkylimidazolinium and alkyloxazolinium salts, in particular those whose alkyl chain has up to 18 carbon atoms, specifically the halides, sulfates, phosphates and acetates.

Suitable ampholytic emulsifiers especially include:

17. Long-chain-substituted amino acids, such as N-alkyl-di(aminoethyl)glycine or N-alkyl-2-aminopropionic acid salts.

18. Betaines, such as N-(3-acylamidopropyl)-N,N-dimethylammonium salts having a $C_8$-$C_{18}$-acyl radical and alkylimidazolium betaines.

Preferred emulsifiers include nonionic emulsifiers, in particular the alkyl polyglycol ethers mentioned above at 6, the addition products of alkylamines with ethylene oxide or propylene oxide mentioned at 9, the alkyl polyglycosides mentioned at 11, and the polyvinyl alcohols mentioned at 5.

Emulsifiers are employed in amounts of 1% by weight to 70% by weight based on the total weight of the aqueous emulsions.

The aqueous emulsions for hydrophilic treatment of fibrous substrates that is washfast in terms of softness preferably contain low-cyclics derivatives of amino-functional organopolysiloxanes (A) in amounts of 0.5% by weight to 80% by weight based on the total weight of the aqueous emulsions.

The aqueous emulsions according to the invention for hydrophilic treatment of fibrous substrates that is washfast in terms of softness may also contain further substances, such as polyethylene glycols, polypropylene glycols and polyethylene-polypropylene glycols and mixtures thereof and also acids. Examples of acids include carboxylic acids, such as acetic acid, formic acid, citric acid, malic acid and lactic acid.

The aqueous emulsions according to the invention for hydrophilic treatment of fibrous substrates that is washfast in terms of softness may contain solvents or co-emulsifiers (B') as further substances.

Examples of nonaqueous solvents or co-emulsifiers include 1-pentanol, 1-hexanol, 1-octanol, propanediol, 1,3-butanediol, 1,2-hexanediol, 2-ethylhexane-1,3-diol, 1,2-octanediol, glycerol, diethylene glycol methyl ether, diethylene glycol ethyl ether, diethylene glycol mono-n-butyl ether, propylene glycol methyl ether.

The amino-functional organopolysiloxanes (1) of formula (XIV) used in the production of the low-cylics derivatives of amino-functional organopolysiloxanes according to the invention for hydrophilic treatment of fibrous substrates that is washfast in terms of softness may be produced by the process described in U.S. Pat. No. 7,129,369 B2 (incorporated by reference). Other processes are also known to those skilled in the art.

To reduce the D4, D5 and D6 cyclics contents of the low-cyclics derivatives of amino-functional organopolysiloxanes according to the invention to concentrations of less than 0.1% by weight in each case the purification process may be carried out either on the amino-functional organopolysiloxane precursors or after the first reaction stage with the hydroxy-free lactones or cyclic carbonic esters (2) before the alcohols or alcohol adducts (3) are employed in the second stage.

The process for producing the composition according to the invention containing low-cyclics derivatives of amino-functional organopolysiloxanes produces no amounts of D4, D5 or D6 cyclics detectable over measurement error. In both cases the purification procedure preferably proceeds in identical fashion via a commercially available thin-film evaporator or a short-path distillation apparatus. A flash box may optionally be arranged upstream for faster prepurification. The purification process is carried out at temperatures of preferably 100° C. to 200° C., preferably from 140° C. to 190° C., particularly preferably from 150° C. to 180° C. The purification process by thin-film evaporator is preferably carried out at pressures between 0 and 200 mbar, preferably between 0 and 100 mbar, particularly preferably between 0 and 30 mbar. The purification process by short-path distillation apparatus is preferably carried out at pressures between 0 and 20 mbar, preferably between 0 and 10 mbar, particularly preferably between 0 and 3 mbar.

Examples of fibrous substrates treated with the compositions according to the invention containing low cyclics derivatives of amino-functional organopolysiloxanes (A) include natural or synthetically produced fibers, yarns, strands, ropes, textile fabrics such as nonwovens, mats, woven, knotted, crocheted or knitted textiles, leather and artificial leather and hair. Preferred fibrous substrates are textiles. For the application of the composition according to the invention the textiles may be in the form of individual fibers, fiber bundles, filler fibers, yarns, carpets, material webs or articles of clothing or parts of articles of clothing.

The textiles may be made of cotton, wool, copolymers of vinyl acetate, rayon, hemp, natural silk, polypropylene, polyethylene, polyester, polyurethane, polyamide, aramid, polyimide, polyacrylate, polyacrylonitrile, polylactide, polyvinyl chloride, glass fibers, ceramic fibers, cellulose or mixtures thereof.

Application to the fibrous substrates to be treated, preferably textiles, may be carried out in any manner that is suitable for the treatment of fibrous substrates, such as textiles, and is well known, for example by immersion, brush application, curtain coating, spraying, roller application, padding, printing or foam application.

In use the compositions according to the invention may be combined with customary textile auxiliaries, such as binders made of melamine or methylol resins, polyethylenes, polyurethanes, polyacrylates, polyvinyl alcohols, polyvinyl acetates, optical brighteners, matting agents, electrolytes, wetting auxiliaries, plastics, bleaching agents, antistats, dispersions of metal oxides, silicates, perfume oils, dyes, preservatives, defoamers or other hydrophobizing and oleophobizing auxiliaries, for example perfluorinated hydrocarbons.

The compositions according to the invention may further be employed with textile softeners based on polysiloxanes and organic softeners such as anionic, cationic and nonionic softeners and mixtures thereof.

These include functional and non-functional silicones, salts of metal soaps, alkyl polysulfonates, sulfosuccinates and derivatives thereof, esterquats, sulfoalkylene fatty acid amides, alkylammonium sulfates, triethanolamine fatty acid esters, fatty acid polyglycol esters, fatty amine polyalkylene adducts, fatty acid amide polyalkylene adducts and dispersions of paraffins, waxes, polyethylenes and polyesters.

The treated fibrous substrates, preferably textiles, are preferably allowed to dry at temperatures of 20° C. to 200° C., preferably 100° C. to 180° C.

The compositions according to the invention containing low-cyclics derivatives of amino-functional organopolysiloxanes (A) have the advantage that their impurities of octamethylcyclotetrasiloxane (D4 cyclics), dcamethylcyclopentasiloxane (D5 cyclics) and dodecamethylcyclohexasiloxane (D6 cyclics) are present in proportions of less than 0.1% by weight in each case and after a storage time of 20 days at a temperature of 50° C. the proportions of D4, D5 and D6 cyclics remain below 0.1% by weight in each case, that they are cost-effective to produce, that they are largely colorless as a result of the virtually colorless low-cyclics derivatives of amino-functional organopolysiloxanes and that the fibrous substrates treated therewith, such as textiles, are hydrophilic and exhibit softness which endures after repeated washing.

In the examples described below all reported quantities in parts and percentages are based on weight unless otherwise stated. All viscosity data are based on a temperature of 25° C. Unless otherwise stated the examples which follow are performed at a pressure of the surrounding atmosphere, i.e. about 1010 hPa, and at room temperature, i.e. at about 20° C., or at a temperature that results when combining the reactants at room temperature without additional heating or cooling.

Dynamic viscosities were measured using an Anton Paar "MCR 302" rheometer according to DIN EN ISO 3219: 1994 and DIN 93019, wherein a cone and plate system (cone CP50-2) with an opening angle of 2° was used. The instrument was calibrated with Normalöl 10000 from the National Metrology Institute. The measuring temperature was 25.00° C.±0.05° C., and the measuring time 3 min. The viscosity specification (reported in mPa·s) represents the arithmetic average of three independently performed individual measurements. The measurement uncertainty of the dynamic viscosity is 1.5%. The shear rate gradient was selected as a function of viscosity and is identified separately for each viscosity specification.

The amine number indicates how many mmol of KOH are equivalent to one gram of the substance to be determined. The amine number is determined according to DIN 16945 version 1989-03.

The Hazen color number was determined by the method of DIN EN ISO 6271 using a Hach-Lange LICO 690 colorimeter. The Hazen color number (DIN-ISO 6271, also known as the "APHA method" or platinum-cobalt scale) is defined as mg of platinum per 1 liter of solution. For the Hazen stock solution, 1.246 g of potassium hexachloroplatinate (IV) and 1.00 g of cobalt (II) chloride are dissolved in 100 ml of hydrochloric acid and made up to 1000 ml with distilled water. The Hazen color scale is used for color assessment of virtually water-clear products.

To determine the end groups for the derivatives of the amino-functional polydimethylsiloxanes, $^{29}$Si NMR spectra are acquired in a solution in $C_6D_6$-toluene on a Bruker Avance III HD-NMhuR spectrometer (5 mm broadband probe with ATMA and Z-gradient) at a measurement frequency of 90.34 MHz.

Evaluation is carried out as known to those skilled in the art and as described in the following literature: "Über die $^{1}$H—, $^{13}$C— und $^{29}$Si NMR chemischen Verschiebungen einiger linearer, verzweigter und cyclischer Methyl-Siloxan-Verbindungen", G. Engelhardt, H. Jancke; J. Organometal. Chem. 28 (1971), 293-300; "Chapter 8 NMR spectroscopy of organosilicon compounds", Elizabeth A. Williams, The Chemistry of Organic Silicon Compounds, 1989 John Wiley and Sons Ltd, 511-533.

D4, D5 and D6 cyclics were determined by gas chromatography using an Agilent 7890 instrument from Agilent Technologies, Wilmington, USA. Analysis was carried via a COC injector (cool-on-column) into a 60 m MXT5 metal capillary coupled with a 5 m deactivated quartz pre-column, with detection by FID. The injector temperature was 50° C. The cool-on-column method ensures that no cyclics are eliminated from the polymeric organosiloxane during measurement.

Determination of the solids content of the emulsions was carried out using a microwave oven from MLS GmbH at a total irradiation time of 5 minutes and an irradiation power of 650 W, wherein 500 mg of emulsion on a glass fiber paper were weighed before and after irradiation. The residual weight is reported as a percentage based on the starting weight.

Testing the pH of the emulsions was carried out with indicator test strips of the type Spezialindikator, pH range 2.0 to 9.0; part no. 1.09584.0001 from Merck KGaA, Darmstadt.

The turbidity of the emulsions was determined using the laboratory turbidimeter LabScat 2 from Sigrist. The scattered fraction of light from a 650 nm LED light source at an angle of 25° to the light beam brought about by the particles of the emulsion was measured. The value is reported in ppm of $SiO_2$ and corresponds to a turbidity that this concentration of kieselguhr in water would cause.

EXAMPLE OF PURIFICATION OF AN AMINO-FUNCTIONAL POLYDIMETHYLSILOXANE FOR USE IN EXAMPLES 2 TO 7

5000 g of an unpurified silanol- and methoxy-terminated laterally aminoethylaminopropyl-functional polydimethylsiloxane having a viscosity of 823 mPa·s and an amine content of 0.288 meq/g was heated in a KDL 1 laboratory short-path distillation apparatus from UIC at a temperature of 180° C. and a pressure of 0.03 mbar at a feed rate of 400 g/h. A distillate amount of 52 g was formed. The bottoms material had a viscosity of 973 mPa·s and an amine content of 0.291 meq/g. This was used as raw material for the low-cyclics derivatives of amino-functional polydimethylsiloxanes in Examples 2 to 7.

Example 1 (Production of a Monohydroxyamidoamino-Functional Polydimethylsiloxane With Butyl Diglycol, Inventive)

In a 1000 ml 3-necked flask fitted with a thermocouple, KPG stirrer and reflux condenser 500 g of an unpurified silanol- and methoxy-terminated laterally aminoethylaminopropyl-functional polydimethylsiloxane having a viscosity of 939 mPa·s and an amine content of 0.288 meq/g (144 mmol of amine) were initially charged and blanketed with nitrogen. At room temperature 6.49 g (75 mmol) of γ-butyrolactone, obtainable from Imhoff & Stahl GmbH, Mannheim, were added with stirring. The clear reaction mixture was subsequently heated to 100° C. and stirred for 5 hours at this temperature. The amine number of the reaction mixture decreased to 0.155 meq/g. The reaction mixture was heated in the KDL 1 laboratory short-path distillation apparatus from UIC at a temperature of 180° C. and a pressure of 0.03 mbar at a feed rate of 250 g/h. A distillate amount of 5.15 g was formed. The bottoms material was recycled to a stirred 3-necked flask apparatus and cooled with stirring. At a temperature of 130° C. 25.5 g of diethylene glycol monobutyl ether, obtainable from Stockmeier Chemie GmbH in Bielefeld, were added and the mixture was slowly cooled to room temperature over 2 h. An almost colorless oil having a viscosity of 2592 mPa·s, a residual amine content of 0.147 meq/g and a hazen color number of 3 was obtained. According to GC determination (cool-on-column method) the cyclics proportions were 123 ppm of D4, 96 ppm of D5 and 148 ppm of D6. After 20 days of storage at 50° C., the value of D4 increased to 164 ppm. Relative to the amino-functional precursor the derivatized product has a new signal in the $^{29}Si$ NMR spectrum at a chemical shift of −12.9 ppm which is assignable to the terminal diethylene glycol monobutyl ether-bonded silicon atom.

Example 2 (Production of a Monohydroxycarbamatoamino-Functional Polydimethylsiloxane With Butyl Diglycol, Inventive)

In a 1000 ml 3-necked flask fitted with a thermocouple, KPG stirrer and reflux condenser 600 g (184 mmol of amine) of a low-cyclics silanol- and methoxy-terminated laterally aminoethylaminopropyl-functional polydimethylsiloxane from the purification example having a viscosity of 959 mPa·s and an amine content of 0.306 meq/g were initially charged and blanketed with nitrogen. According to GC determination (cool-on-column method) the cyclics proportions were 230 ppm of D4, 330 ppm of D5 and 380 ppm of D6. At room temperature, 30.0 g of diethylene glycol monobutyl ether and 9.38 g (92 mmol) of propylene carbonate, obtainable from Huntsman Holland BV, Rotterdam, were added with stirring. The clear reaction mixture was subsequently heated to 80° C. and stirred at this temperature for 3 hours. An almost colorless oil having a viscosity of 1907 mPa·s, a residual amine content of 0.153 meq/g and a hazen color number of 2 was obtained. According to GC determination (cool-on-column method) the cyclics proportions were 286 ppm of D4, 330 ppm of D5 and 283 ppm of D6. After 20 days of storage at 50° C., the value of D4 increased to 323 ppm. Relative to the amino-functional precursor the derivatized product has a new signal in the $^{29}Si$ NMR spectrum at a chemical shift of −12.9 ppm which is assignable to the terminal diethylene glycol monobutyl ether-bonded silicon atom.

Example 3 (Production of a Monohydroxycarbamatoamino-Functional Polydimethylsiloxane With Butyl Diglycol, Inventive)

In a 1000 ml 3-necked flask fitted with a thermocouple, KPG stirrer and reflux condenser 600 g (184 mmol of amine) of the amino-functional polydimethylsiloxane precursor from example 2 were initially charged and blanketed with nitrogen. At room temperature, 9.38 g (92 mmol) of propylene carbonate were added with stirring. The reaction mixture was then heated to 80° C. The initially turbid mixture became clear upon attaining 80° C. and was stirred at this temperature for 3 hours. 30.0 g of diethylene glycol monobutyl ether were then stirred in and the mixture was slowly cooled to room temperature over 2 hours. An almost colorless oil having a viscosity of 1278 mPa·s, a residual amine content of 0.160 meq/g and a hazen color number of 3 was obtained. According to GC determination (cool-on-column method) the cyclics proportions were 108 ppm of D4, 77 ppm of D5 and 124 ppm of D6. After 20 days of storage at 50° C., the value of D4 increased to 146 ppm. Relative to the amino-functional precursor the derivatized product has a new signal in the $^{29}Si$ NMR spectrum at a chemical shift of −12.9 ppm which is assignable to the terminal diethylene glycol monobutyl ether-bonded silicon atom.

Example 4 (Production of an Acetamidoamino-Functional Polydimethylsiloxane With Butyl Diglycol, Noninventive)

In a 2000 ml 3-necked flask fitted with a thermocouple, KPG stirrer, dropping funnel and reflux condenser 935.58 g (286 mmol of amine) of the amino-functional polydimethylsiloxane precursor from example 2 were initially charged, blanketed with nitrogen and heated to 55° C. 25.17 g of diethylene glycol monobutyl ether were then stirred in and the resulting mixture stirred at 55° C. for a further 30 minutes. 14.08 g (138 mmol) of acetic anhydride, obtainable from Sigma-Aldrich Chemie GmbH, Steinheim, were then slowly added dropwise with stirring. As a result of the exothermicity the temperature increased to 65° C. Subsequently, the clear reaction mixture was heated to 80° C. and stirred at this temperature for 30 minutes. A further 25.17 g of diethylene glycol monobutyl ether were then stirred in and the resulting mixture stirred at 80° C. for a further hour. A yellow oil having a viscosity of 2672 mPa·s, a residual amine content of 0.152 meq/g and a hazen color number of 9 was obtained. According to GC determination (cool-on-column method) the D4 cyclics proportion was 148 ppm. After 20 days of storage at 50° C., the cyclics proportion increased to 1312 ppm.

Example 5 (Production of a Pentahydroxyamidoamino-Functional Polydimethylsiloxane With Butyl Diglycol, Noninventive)

In a 500 ml 3-necked flask fitted with a thermocouple, KPG stirrer, dropping funnel, reflux cooler, distillation bridge and vacuum pump with control means 180 g (55 mmol of amine) of the amino-functional polydimethylsiloxane precursor from example 2 together with 180 g of isopropanol were initially charged and blanketed with nitrogen. At room temperature and standard pressure 4.73 g (55 mmol) of gluconolactone, obtainable from Sigma-Aldrich Chemie GmbH, Steinheim, were added with stirring. The turbid reaction mixture was then heated to 80° C. The mixture was stirred at this temperature for 3 hours, during which time it became increasingly clear. A vacuum of 350 mbar was then applied at this temperature setting and isopropanol was distilled off. Simultaneously, 16.2 g of diethylene glycol monobutyl ether were stirred in via the dropping funnel and the vacuum was improved to 180 mbar over 2 hours. Depending on the distillation rate, the temperature of the mixture fell to 65° C. to 55° C. 160 g of distillate were obtained. The contents of the flask became increasingly viscous and yellowish with slight turbidity. A homogeneous, viscous and yellowish oil having a viscosity of 7180 mPa·s, a residual amine content of 0.075 meq/g and a hazen color number of 9 was obtained.

Example 6 (Production of a Dihydroxycarbamatoamino-Functional Polydimethylsiloxane With Butyl Diglycol, Noninventive)

In a 1000 ml 3-necked flask fitted with a thermocouple, KPG stirrer and reflux condenser 500 g (153 mmol of amine) of the amino-functional polydimethylsiloxane precursor from example 2 were initially charged and blanketed with nitrogen. At room temperature, 25.0 g of diethylene glycol monobutyl ether and 8.71 g (74 mmol) of glycerol carbonate, obtainable from Huntsman Holland BV, Rotterdam, were added with stirring. The turbid reaction mixture was subsequently heated to 80° C. and stirred at this temperature for 3 hours. A clear, slightly yellowish, viscous oil having a viscosity of 17800 mPa·s, a residual amine content of 0.152 meq/g and a hazen color number of 5 was obtained.

Example 7 (Production of a Monohydroxycarbamatoamino-Functional Polydimethylsiloxane With Isotridecanol, Noninventive)

In a 500 ml 3-necked flask fitted with a thermocouple, KPG stirrer and reflux condenser 300 g (92 mmol of amine) of the amino-functional polydimethylsiloxane precursor from example 2 were initially charged and blanketed with nitrogen. At room temperature, 15.0 g of isotridecanol (available from ABCR GmbH, Karlsruhe) and 4.69 g (46 mmol) of propylene carbonate were added with stirring. The reaction mixture was heated to 80° C. and stirred at this temperature for 3 hours. The contents of the flask became clear upon attaining 75° C. An almost colorless, viscous oil having a viscosity of 9500 mP·s and a residual amine content of 0.176 meq/g was obtained. Relative to the amino-functional precursor the derivatized product has several new signals in the $^{29}Si$ NMR spectrum at a chemical shift in the region of −13.8 ppm which are assignable to the terminal isotridecanol-bonded silicon atoms.

Example 8 (Production of an Emulsion From the Inventive Monohydroxyamidoamino-Functional Polydimethylsiloxane From Example 1)

21.0 g of demineralized water, 12.0 g of tridecyl alcohol ethoxylate with 5 EO, 8.5 g of tridecyl alcohol ethoxylate with 8 EO (obtainable as LUTENSOL® TO 5 and LUTENSOL® TO 8 respectively from BASF SE, Ludwigshafen), 4.0 g of diethylene glycol monobutyl ether and 2.0 g of laureth-11 carboxylic acid (obtainable as Akypo RLM 100 from Kao Chemicals GmbH, Emmerich) were mixed in a laboratory dissolver (Dispermat CN 30 from VMA-Getzmann GmbH, Reichshof) at a speed of 800 rpm. 35.0 g of the monohydroxyamidoamino-functional polydimethylsiloxane from example 1 were then incorporated in three approximately equal portions at a speed of 1000 rpm. The thick, creamy mixture was diluted initially with 4.87 g and then with 12.5 g of demineralized water. The almost colorless microemulsion had a solids content of 62%, a pH of 6.0 and a turbidity of 4 ppm of $SiO_2$.

Example 9 (Production of an Emulsion From the Inventive Monohydroxycarbamatoamino-Functional Polydimethylsiloxane From Example 2)

35.0 g of the monohydroxycarbamatoamino-functional polydimethylsiloxane from example 2 were emulsified according to example 8 to afford an almost colorless microemulsion having a solids content of 61%, a pH of 6.0 and a turbidity of 1 ppm of $SiO_2$.

Example 10 (Production of an Emulsion From the Noninventive Monohydroxyamidoamino-Functional Polydimethylsiloxane From Example 4)

35.0 g of the acetamidoamino-functional polydimethylsiloxane from example 4 were emulsified according to example 8 to afford a yellow microemulsion having a solids content of 61%, a pH of 4.5 and a turbidity of 3 ppm of $SiO_2$.

Example 11 (Production of an Emulsion From the Noninventive Pentahydroxyamidoamino-Functional Polydimethylsiloxane From Example 5)

21.0 g of demineralized water, 12.0 g of tridecyl alcohol ethoxylate with 5 EO, 8.5 g of tridecyl alcohol ethoxylate with 8 EO and 2.0 g of laureth-11 carboxylic acid (obtainable as Akypo RLM 100 from Kao Chemicals GmbH, Emmerich) were mixed in a laboratory dissolver at a speed of 800 rpm. 35.0 g of the pentahydroxyamidoamino-functional polydimethylsiloxane from example 5 were then incorporated in three approximately equal portions at a speed of 1000 rpm. The highly viscous mixture was diluted initially with 4.87 g and then with 12.5 g of demineralized water. The turbid, viscous emulsion had a solids content of 62%, a pH of 5.5 and a turbidity of 250 ppm of $SiO_2$. The missing proportion of diethylene glycol monobutyl ether was compensated by the increased proportion thereof in the pentahydroxyamidoamino-functional polydimethylsiloxane.

Example 12 (Production of an Emulsion From the Noninventive Dihydroxycarbamatoamino-Functional Polydimethylsiloxane From Example 6)

35.0 g of the dihydroxycarbamatoamino-functional polydimethylsiloxane from example 6 were emulsified according to example 8 to afford a turbid emulsion having a solids content of 60%, a pH of 6.5 and a turbidity of 140 ppm of $SiO_2$.

Example 13 (Production of an Emulsion From the Noninventive Monohydroxycarbamatoamino-Functional Polydimethylsiloxane From Example 7)

35.0 g of the monohydroxycarbamatoamino-functional polydimethylsiloxane from example 7 were emulsified according to example 8 to afford an almost colorless but diffusely turbid emulsion having a solids content of 62%, a pH of 5.5 and a turbidity of 253 ppm of $SiO_2$. Separation into 2 phases began after 3 weeks of storage.

Example 14 (Production of an Emulsion From the Amino-Functional Polydimethylsiloxane Raw Material From Examples 2 to 7; Softness Reference)

21.0 g of demineralized water, 12.0 g of tridecyl alcohol ethoxylate with 5 EO, 8.5 g of tridecyl alcohol ethoxylate with 8 EO, 4.0 g of diethylene glycol monobutyl ether, 2.0 g of laureth-11 carboxylic acid and 0.32 g of glacial acetic acid were mixed in a laboratory dissolver at a speed of 800 rpm. 35.0 g of the low-cyclics silanol- and methoxy-terminated laterally aminoethylaminopropyl-functional polydimethylsiloxane raw material having a viscosity of 959 mPa·s and an amine content of 0.306 meq/g from examples 2 to 7 were then incorporated in three approximately equal portions at a speed of 1000 rpm.

The thick, creamy mixture was diluted initially with 4.87 g and then with 12.5 g of demineralized water. The colorless, opalescent microemulsion had a solids content of 61%, a pH of 5.0 and a turbidity of 42 ppm of $SiO_2$.

Example 15 (Production of a Silicone-Polyether Copolymer According to Example 4 in US 2008/0075683 A1 For Hydrophilic Reference Emulsion)

635 g of an α,ω-dihydrogenpolydimethylsiloxane with 0.052% by weight of Si-bonded hydrogen were mixed with 205 g of a polyether of formula $H_2C{=}CH{-}CH_2{-}(OCH_2CH_2)_{9,5}{-}OH$. The mixture was heated to 100° C. and 0.28 g of a 2.7% by weight (based on elemental platinum) solution of a platinum-1,3-divinyl-1,1,3,3-tetramethyldisiloxane complex in an α,ω-divinyldimethylpolysiloxane having a viscosity of 1000 mPa·s at 25° C., a solution of the so-called Karstedt catalyst (the production of which is described in U.S. Pat. No. 3,775,452), was added to the mixture, whereupon the temperature of the reaction mixture increased by 19° C. and a clear product was formed. After one hour at 100° C. to 110° C. complete conversion of the Si-bonded hydrogen was achieved. The polyether-polysiloxane intermediate had an OH concentration of 0.512 meq/g and contained 177 ppm water.

200 g of this intermediate were mixed with 10.3 g of bis(dimethylaminopropyl)amine and heated to 84° C.; 13.2 g of hexamethylene diisocyanate were added.

The ratio of the NCO groups to the sum of the organic functions reactive therewith was 0.998, and 0.97 including water.

Without further catalysis complete conversion of the isocyanate groups was achieved in one hour at about 90° C. by slightly exothermic reaction. The polymer blend contained 0.49 meq/g of basic nitrogen.

32 g of this polymer was neutralized with a solution of 1.04 g of acetic acid in 8 g of diethylene glycol monobutyl ether.

Example 16 (Production of an Emulsion From the Silicone-Polyether Copolymer in Example 15; Hydrophilicity Reference)

21.0 g of demineralized water, 12.0 g of tridecyl alcohol ethoxylate with 5 EO, 8.5 g of tridecyl alcohol ethoxylate with 8 EO and 2.0 g of laureth-11 carboxylic acid were mixed in a laboratory dissolver at a speed of 800 rpm. 35.0 g of the silicone-polyether copolymer from example 15 were then incorporated in three approximately equal portions at a speed of 1000 rpm. The flowable mixture was diluted initially with 4.87 g and then with 12.5 g of demineralized water. The milky emulsion had a solids content of 54% and a pH of 6.0.

Performance Tests

An untreated 100% CO interlock knitted fabric having a basis weight of 190 g/m² was used for textile treatment.

A fabric padded with water and dried (=blank value) was used as a reference.

The fabric was impregnated with the respective liquor, squeezed off with a two-roll pad mangle to a wet pickup of 77%, stretched out and dried in a MATHIS laboratory tenter at 150° C. for three minutes. The fabric was then acclimatized for at least 12 hours in a conditioning chamber at 23° C. and 62% humidity.

Determination methods for results of the use examples:

Determination of softness(hand assessment):

Since the softness of textiles is strongly dependent on the subjective perception of the test persons, only the boundary conditions, but not the assessment, can be standardized. In order nevertheless to ensure reproducibility, the treated samples were assessed and ranked in terms of their softness. To this end points were awarded by four persons in accordance with the number of tested samples, wherein the magnitude of the score awarded correlates with softness. The softest sample receives the maximum score, while the least soft sample receives 0 points. The hand assessment of a sample is thus calculated as the average of the points awarded to this sample in each case.

Determination of droplet absorption time:

Following application of the silicone product the treated sample was stored for eight hours in a conditioning chamber at a temperature of 23° C. and an atmospheric humidity of 62% for accclimatization and then a droplet of deionized water was placed on the taut fabric surface from a height of 1 cm and the time taken for the fabric to absorb the water droplet was determined up to a maximum of three minutes (180 seconds).

Five determinations were performed and the average calculated.

Determination of washfastness:

To examine washfastness, all of the treated textiles were washed together with about 3 kg of ballast in a Siemens SIWAMAT 6143 domestic washing machine on the colors cycle at 60° C. and subjected to a spin at 1400 rpm. As the laundry surfactant, 36 g of Henkel "Spee Feincolor" liquid washing detergent were used. Altogether 2 washing cycles of 90 minute duration in each case were performed without intermediate drying. The fabric was then dried and acclimatized for at least 12 hours in a conditioning chamber at 23° C. and 62% humidity. The fabric samples were then re-subjected to a softness comparison.

The table below summarizes the results of the fabric treated using the padding process for several use examples.

TABLE

| Examples and comparison | Solids content in [%] | Usage amount in [g/l] | Droplet test in [s] | Softness before washing | Softness after 2 washes |
|---|---|---|---|---|---|
| Example 8 | 62 | 10.0 | 4 | 4.75 | 5.13 |
| Example 9 | 61 | 10.0 | 3 | 5.25 | 5.62 |
| Example 10 (Comparison) | 61 | 10.0 | 17 | 4.25 | 4.63 |
| Example 11 (Comparison) | 62 | 10.0 | 28 | 2.88 | 3.50 |
| Example 12 (Comparison) | 60 | 10.0 | 16 | 3.25 | 3.87 |
| Example 13 (Comparison) | 62 | 10.0 | 9 | 3.62 | 4.25 |
| Example 14 (hand reference) | 61 | 10.0 | 85 | 7.75 | 8 |
| Example 16 (hydrophilicity reference) | 54 | 11.3 | 1 | 4.25 | 1 |
| Blank value | | | 0 | 0 | 0 |

The textiles treated according to the invention with monohydroxyamido- or monohydroxycarbamato-containing amino-functional polydimethylsiloxanes (derivatization with γ-butyrolactone and propylene carbonate, examples 8 and 9 respectively) show a markedly shorter droplet absorption time compared to textiles treated with acetamido-, pentahydroxyamido and dihydroxycarbamato-containing amino-functional polydimethylsiloxanes (derivatization with acetic anhydride, gluconolactone and glycerol carbonate, comparative examples 10, 11 and 12 respectively) and to underivatized amino-functional polydimethylsiloxanes (comparative example 14). A person skilled in the art would expect that due to a higher proportion of hydroxy groups, more polar functional groups should provide the fibrous substrates with more hydrophilic properties. However, it is surprisingly the inventive monohydroxy-containing derivatives that are most hydrophilic in the group of non-polyether-containing amino-functional polydimethylsiloxanes. In addition to a clearer appearance and better stability, the emulsion of the inventive diethylene glycol monobutyl ether-terminated monohydroxycarbamato-containing amino-functional polydimethylsiloxane (example 9) also has hydrophilicity advantages compared to the comparable but noninventive emulsion of the isotridecanal-terminated polydimethylsiloxane oil (comparative example 13). Compared to the silicone-polyether copolymer produced by hydrosilylation and isocyanate bridging (comparative example 16), the inventive monohydroxy-containing aminosilicone derivatives (examples 8 and 9) are very washfast in terms of softness despite featuring good hydrophilic properties. The purely amino-functional hand reference (comparative example 14) has very good softness properties before and after washing but cannot be employed in hydrophilic treatment.

As shown by examples 1 to 4 and as opposed to noninventive acetamido-containing aminosilicone derivatives (comparative example 4) the inventive aminohydroxy-containing aminosilicone-derivatives of examples 1 to 3 do not re-form higher amounts of D4 cyclics in demanding storage at 50° C., so that good storage stability in respect of low-cyclics properties and accordingly unnecessary SVHC (substances of very high concern) classifications can be assumed. The viscosities of the inventive derivatives of amino-functional polydimethylsiloxanes are all in the range below 5000 mPa·s at 25° C.

The invention claimed is:

1. A hydrophilic washfast treatment for fibrous substrates that includes derivatives of amino-functional organopolysiloxanes of general formula (X)

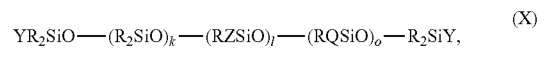

(X)

wherein k is an integer from 50 to 700, 1 is an integer from 1 to 30 and o is an integer from 0 to 30, R may be identical or different and represents a hydrogen atom or a monovalent, optionally fluorine-, chlorine- or bromine-substituted, $C_1$-to $C_{18}$-hydrocarbon radical, Z represents a group of general formula (V)

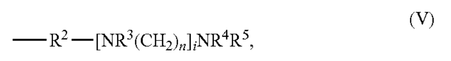

(V)

wherein i is 0, 1, 2, 3 or 4, n is 2, 3, 4, 5 or 6, $R^2$ represents a divalent, linear or branched $C_1$-to $C_{18}$-hydrocarbon radical, $R^3$ represents a hydrogen atom, an optionally fluorine-, chlorine-, bromine-, hydroxy- or $C_1$-to $C_5$-alkoxy-substituted $C_1$-to $C_{18}$-hydrocarbon radical, or an acyl radical or a radical of general formula (VI), $R^4$ represents a radical of general formula (VI),

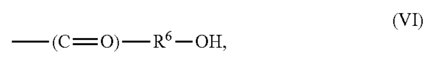

(VI)

$R^5$ represents a hydrogen atom or an optionally fluorine-, chlorine-, bromine-, hydroxy- or $C_1$-to $C_5$-alkoxy-substituted $C_1$-to $C_{18}$-hydrocarbon radical or an acyl radical, $R^6$ represents an—$OR^7$-radical, $R^7$ represents a divalent linear or branched $C_2$-to $C_8$-hydrocarbon radical, Q represents a group of general formula (VII)

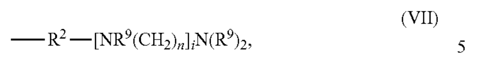

(VII)

wherein i and n are as defined above, $R^9$ may be identical or different and represents a hydrogen atom, an optionally fluorine-, chlorine-, bromine-, hydroxy-or $C_1$-to $C_5$-alkoxy-substituted $C_1$- to $C_{18}$-hydrocarbon radical or an acyl radical, Y represents a radical of general formula (VIII) and/or (IX), (VIII)

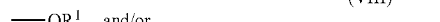

(IX)

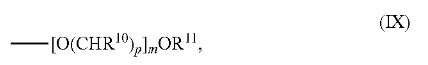

wherein m is 0 or an integer from 1 to 100, and p is 2, 3 or 4, $R^1$ represents a hydrogen atom or a $C_1$-to $C_4$-alkyl radical, $R^{10}$ represents a hydrogen atom or a $C_1$-to $C_{18}$-hydrocarbon radical, $R^{11}$ represents a hydrogen atom, a $C_1$-to $C_{10}$-hydrocarbon radical, or a group of formula —(C═O)—$R^{12}$ $R^{12}$ represents a $C_1$-to $C_{10}$-hydrocarbon radical or an —$OR^{13}$-radical, and $R^{13}$ represents a $C_1$-to $C_{10}$-hydrocarbon radical, with the proviso that at least a portion of the radicals Y are radicals of formula (IX), with the proviso that impurities of octamethylcyclotetrasiloxane (D4 cyclics), decamethylcyclopentasiloxane (D5 cyclics) and dodecamethylcyclohexasiloxane (D6 cyclics) are present in proportions of less than 0.1% by weight in each case and after a storage time of 20 days at a temperature of 50° C. the proportions of D4 cyclics, representative of D4, D5 and D6, remain below 0.1% by weight in each case, based in each case on the total weight of the derivatives of amino-functional organopolysiloxanes, with the proviso that in addition to the radicals of the formula (VIII) which are hydroxyl or methoxy radicals, wherein from 5 mol % to 60 mol % of the radicals Y are radicals of the formula (IX) which are $C_4$-$C_{10}$-alkoxy radicals or $C_4$-$C_{10}$-monoalkyl glycol ether radicals, wherein the treatment, when applied to a 100% CO interlock knitted fabric, provides a droplet absorption time of less than 5 seconds.

2. The hydrophilic washfast treatment as claimed in claim 1, wherein m is 0 or an integer from 1 to 20, and $R^{11}$ represents a hydrogen atom, a $C_4$-to $C_{10}$-hydrocarbon radical, or a group of formula

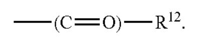

3. The hydrophilic washfast treatment as claimed in claim 1, wherein the compositions employed are aqueous emulsions containing the low-cyclics derivatives of amino-functional organopolysiloxanes (A), emulsifiers (B) and/or co-emulsifiers (B') and water (C).

4. The hydrophilic washfast treatment as claimed in claim 1, wherein, after the treatment is applied the 100% CO interlock knitted fabric exhibits a softness value after two washing cycles that is greater than or equal to the softness value before washing.

* * * * *